United States Patent
Lee et al.

(10) Patent No.: US 10,786,895 B2
(45) Date of Patent: Sep. 29, 2020

(54) OPERATION METHOD FOR ACTIVATION OF HOME ROBOT DEVICE AND HOME ROBOT DEVICE SUPPORTING THE SAME

(71) Applicants: Samsung Electronics Co., Ltd., Gyeonggi-do (KR); SNU R&DB FOUNDATION, Seoul (KR)

(72) Inventors: So Hee Lee, Seoul (KR); Dong Hyun Kwak, Gyeonggi-do (KR); Eun Sol Kim, Chungcheongbuk-do (KR); Ji Seob Kim, Gyeonggi-do (KR); Kyoung Woon On, Seoul (KR); Byoung Tak Zhang, Seoul (KR); Kyung Shik Roh, Gyeonggi-do (KR); Suk June Yoon, Seoul (KR)

(73) Assignees: Samsung Electronics Co., Ltd., Yeongtong-gu, Suwon-si, Gyeonggi-do (KR); SNU R&DB Foundation, Gwanak-ro, Gwanak-gu, Seoul (KR)

(*) Notice: Subject to any disclaimer, the term of this patent is extended or adjusted under 35 U.S.C. 154(b) by 351 days.

(21) Appl. No.: 15/831,843

(22) Filed: Dec. 5, 2017

(65) Prior Publication Data
US 2018/0178372 A1    Jun. 28, 2018

(30) Foreign Application Priority Data

Dec. 22, 2016    (KR) .................. 10-2016-0176320

(51) Int. Cl.
*B25J 9/00*    (2006.01)
*G06K 9/00*    (2006.01)
(Continued)

(52) U.S. Cl.
CPC ............. *B25J 9/0003* (2013.01); *B25J 9/161* (2013.01); *B25J 9/1697* (2013.01);
(Continued)

(58) Field of Classification Search
None
See application file for complete search history.

(56) References Cited

U.S. PATENT DOCUMENTS 9,052,710 B1 *  6/2015  Farwell ............... G05B 19/423
9,056,396 B1 *  6/2015  Linnell ............... G05B 19/427
(Continued)

FOREIGN PATENT DOCUMENTS

KR    2003-0065902 A    8/2003

OTHER PUBLICATIONS

Abdat, F, et al., Human-computer interaction using emotion recognition from facial expression, 2011 UKSim 5th European Symposium on Computer Modeling and Simulation, pp. 196-201 (Year: 2011).*

*Primary Examiner* — Ryan Rink
(74) *Attorney, Agent, or Firm* — Cha & Reiter, LLC.

(57) ABSTRACT

A home robot device includes a memory, a movement module, and a processor. The processor is configured to execute a motion based on specified motion execution information stored in the memory, obtain feedback information of a user, generate modified motion execution information by modifying at least a portion of the specified motion execution information based on the feedback information of the user, where the modified motion execution information includes a movement value of at least one joint unit of the home robot device or at least one support linked to the at least one joint unit selected from a probability model of the specified motion execution information, and execute a motion of the home robot device based on the modified motion execution information.

20 Claims, 10 Drawing Sheets

(51) Int. Cl.
  *B25J 9/16* (2006.01)
  *G10L 25/63* (2013.01)
  *B25J 11/00* (2006.01)
  *G10L 15/22* (2006.01)
(52) U.S. Cl.
  CPC ....... *B25J 11/0005* (2013.01); *G06K 9/00255* (2013.01); *G06K 9/00281* (2013.01); *G06K 9/00315* (2013.01); *G06K 9/00335* (2013.01); *G06K 9/00664* (2013.01); *G10L 15/22* (2013.01); *G05B 2219/39254* (2013.01); *G05B 2219/40116* (2013.01); *G10L 25/63* (2013.01); *G10L 2015/223* (2013.01); *Y10S 901/01* (2013.01); *Y10S 901/46* (2013.01); *Y10S 901/47* (2013.01)

(56) References Cited

U.S. PATENT DOCUMENTS

| | | | |
|---|---|---|---|
| 10,194,163 B2* | 1/2019 | Richert | H04N 19/50 |
| 2005/0069208 A1* | 3/2005 | Morisada | G06K 9/00228 |
| | | | 382/190 |
| 2009/0322763 A1* | 12/2009 | Bang | G06F 3/011 |
| | | | 345/474 |
| 2010/0250001 A1* | 9/2010 | Hodgins | B62D 57/032 |
| | | | 700/261 |
| 2011/0118877 A1* | 5/2011 | Hwang | B25J 13/00 |
| | | | 700/264 |
| 2014/0277735 A1 | 9/2014 | Breazeal | |
| 2015/0217444 A1* | 8/2015 | Asada | B25J 5/00 |
| | | | 700/258 |
| 2015/0217449 A1* | 8/2015 | Meier | G06N 3/008 |
| | | | 700/257 |
| 2015/0314454 A1* | 11/2015 | Breazeal | B25J 9/0003 |
| | | | 700/259 |
| 2016/0243699 A1* | 8/2016 | Kim | B62D 57/032 |
| 2017/0008166 A1* | 1/2017 | Favis | B25J 9/1095 |
| 2017/0311863 A1* | 11/2017 | Matsunaga | A61B 5/16 |
| 2018/0021956 A1* | 1/2018 | Atherton | B25J 9/1689 |
| | | | 700/259 |
| 2019/0084158 A1* | 3/2019 | Atherton | B25J 9/1676 |
| 2019/0101985 A1* | 4/2019 | Sajda | G06F 3/013 |
| 2019/0105779 A1* | 4/2019 | Einav | B25J 9/1676 |

* cited by examiner

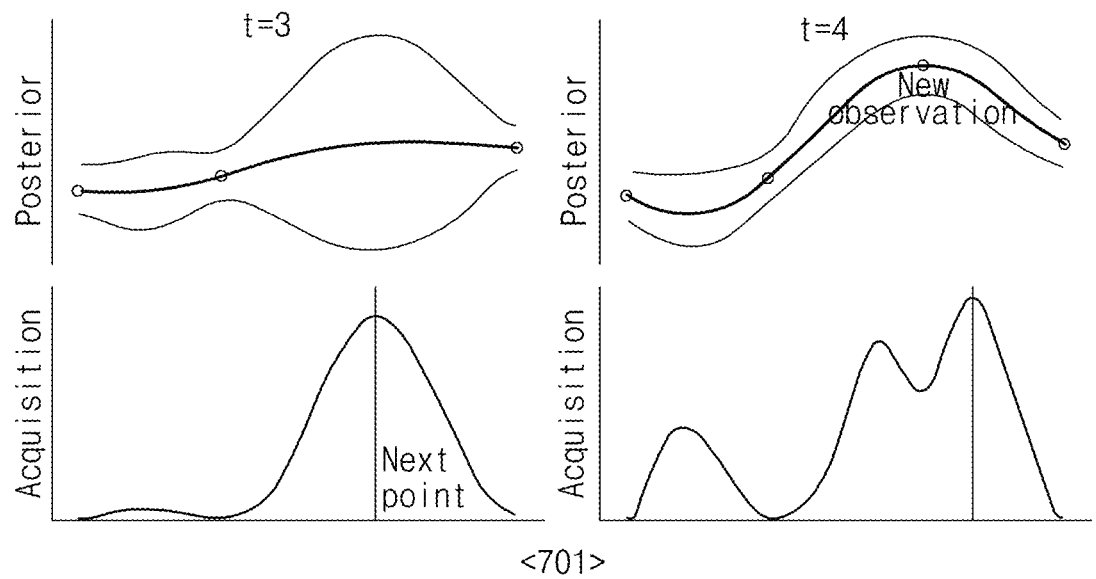
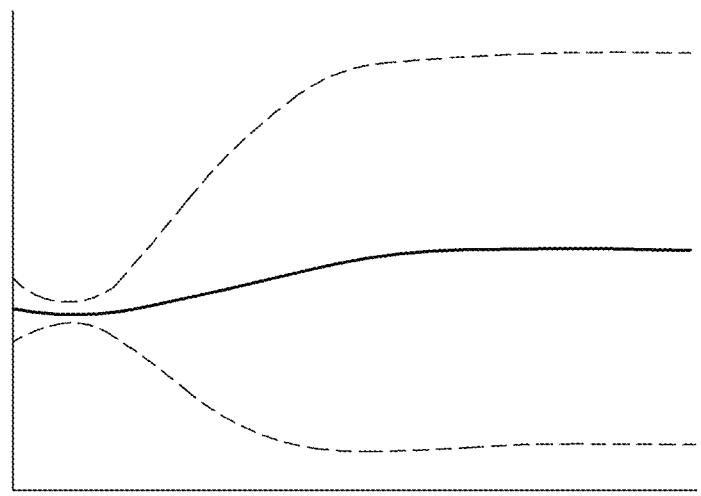
FIG. 7

OPERATION METHOD FOR ACTIVATION OF HOME ROBOT DEVICE AND HOME ROBOT DEVICE SUPPORTING THE SAME

CLAIM OF PRIORITY

This application claims the benefit under 35 U.S.C. § 119(a) of a Korean patent application filed on Dec. 22, 2016 in the Korean Intellectual Property Office and assigned Serial number 10-2016-0176320, the entire disclosure of which is hereby incorporated by reference.

TECHNICAL FIELD

The present disclosure generally relates to a home robot device.

BACKGROUND

Recently, as various home robot devices have been introduced into commerce, the use of the home robot devices has been popularized. For example, home robot devices have been developed to accomplish housework such as cleaning and housekeeping. In other examples, voice-activated home robot devices can perform various functions such as performing Internet searches.

SUMMARY

Currently in the art, home robot devices may generally perform pre-programmed movements, which may not be satisfactory to the user. For example, since a pet robot device repeatedly provides only predefined movements, the user may easily lose interest in the pet robot device. Further, pre-written algorithms for the movement of one robot device may not be appropriate for another robot device. Therefore, whenever new robot devices are manufactured, their movements must be newly programmed.

Certain aspects of the present disclosure are to address at least the above-mentioned problems and/or disadvantages and to provide at least the advantages described below. Accordingly, an aspect of the present disclosure is to provide an operation method for a home robot device and a home robot device supporting the same, which improves the automated movements of the home robot device. The home robot device may mimic movements of the user where the user and the home robot device are anatomically different.

Another aspect of the present disclosure is to provide an operation method for a home robot device and a home robot device supporting the same, capable of variously changing robot motions to increase user satisfaction.

Another aspect of the present disclosure is to provide an operation method for a home robot device and a home robot device supporting the same, which enables the home robot device to perform various and natural motions as well as a specified motion.

In accordance with an aspect of the present disclosure, a home robot device is provided. The home robot device may include a memory, a movement module, and a processor electrically connected with the memory and the movement module. The processor may be configured to execute a motion based on specified motion execution information stored in the memory, obtain feedback information of a user, generate modified motion execution information by modifying at least a portion of the specified motion execution information based on the feedback information of the user, where the modified motion execution information includes a movement value of at least one joint unit of the home robot device or at least one support linked to the at least one joint unit selected from a probability model of the specified motion execution information, and execute a motion of the home robot device based on the modified motion execution information.

In accordance with another aspect of the present disclosure, an operation method for a home robot device is provided. The operation method may include executing a motion of the home robot device based on specified motion execution information stored in a memory, obtaining feedback information of a user, generating modified motion execution information by modifying at least a portion of the specified motion execution information based on the feedback information of the user, where the modified motion execution information includes a movement value of at least one joint unit of the home robot device or at least one support linked to the at least one joint unit selected from a probability model of the specified motion execution information and executing a motion of the home robot device based on the modified motion execution information.

As described above, various embodiments of the present disclosure may allow a user to interchange feelings with the home robot device, to have an interest in the home robot device, and to persistently maintain the interest of the user in the home robot device. In addition, various embodiments of the present disclosure may increase the movement capability of home robot devices and may support the home robot devices such that the home robot devices perform natural and new motions.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a graph illustrating the learning of the home robot device, according to an embodiment of the present disclosure;

Throughout the drawings, it should be noted that like reference numbers are used to depict the same or similar elements, features, and structures.

DETAILED DESCRIPTION

Figure 1:
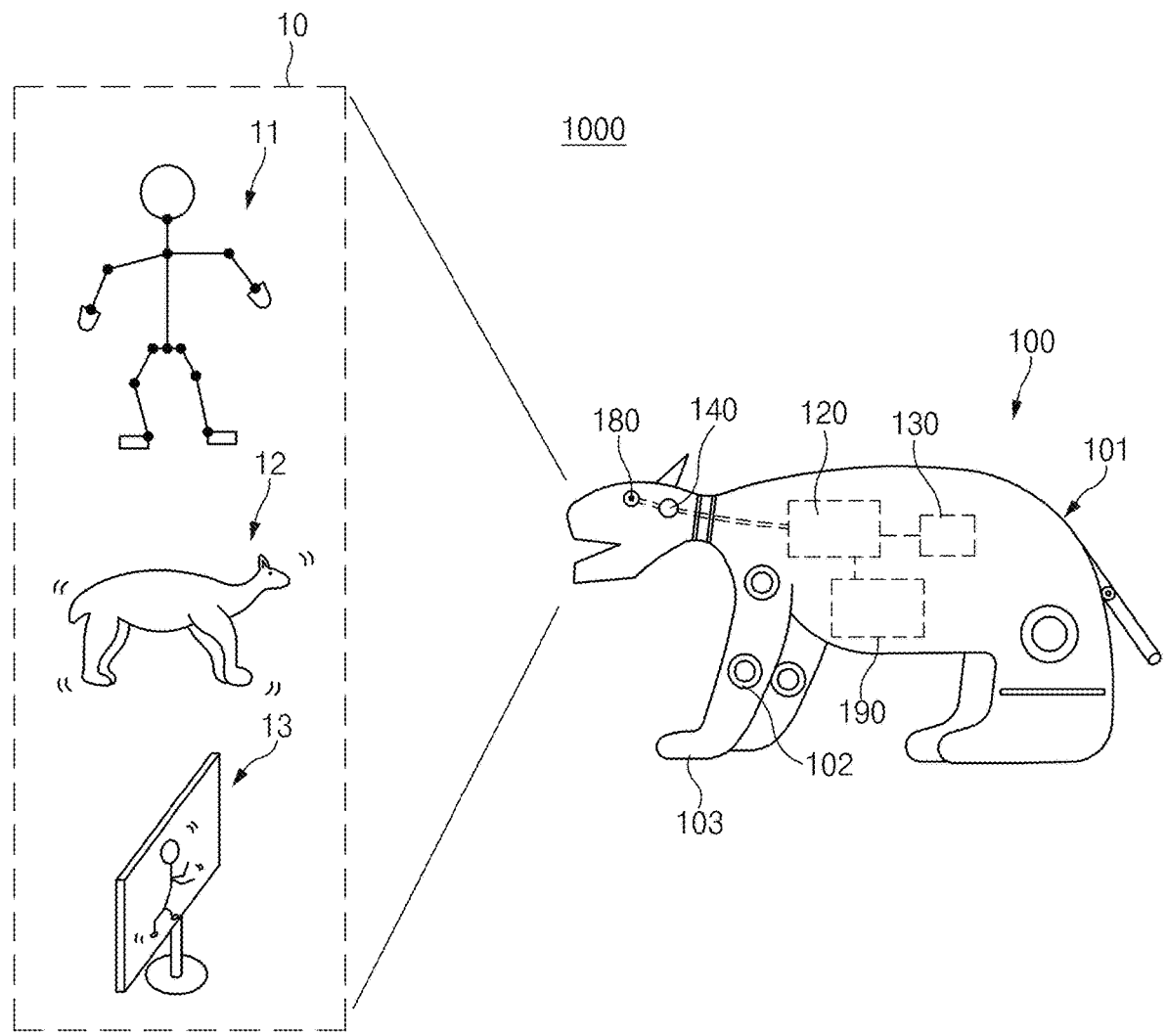
FIG. 1 is a view illustrating an operating environment of a home robot device, according to an embodiment of the present disclosure.

Various embodiments of the present disclosure may be described with reference to accompanying drawings. Accordingly, those of ordinary skill in the art will recognize that modifications, equivalents, and/or alternatives of the various embodiments described herein can be variously made without departing from the scope and spirit of the present disclosure.

In the disclosure disclosed herein, the expressions "have," "may have," "include," "comprise," "may include," and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," "one or more of A or/and B," and the like used herein may include any and all combinations of one or more of the associated listed items. For example, the term "A or B," "at least one of A and B," or "at least one of A or B" may refer to any or all of the cases (1) where at least one A is included, the case (2) where at least one B is included, or the case (3) where both of at least one A and at least one B are included.

The terms, such as "first," "second," and the like used herein may refer to various elements of various embodiments, but do not limit the elements. Furthermore, such terms may be used to distinguish one element from another element. For example, "a first user device" and "a second user device" may indicate different user devices regardless of the order or priority thereof.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of." The term "configured to" may not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art unless expressly so defined in the present disclosure. In some cases, even if terms are terms which are defined in the specification, they may not be interpreted to exclude embodiments of the present disclosure.

Electronic devices according to various embodiments of the present disclosure may be smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart watches, and the like.

According to another embodiment, the electronic devices may be home appliances. The home appliances may be, for example, televisions (TVs), digital versatile disc (DVD) players, audio devices, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may be medical devices (e.g., various portable medical measurement devices (e.g., a blood glucose monitoring device, a heartbeat measuring device, a blood pressure measuring device, a body temperature measuring device, and the like), magnetic resonance angiography (MRA) devices, magnetic resonance imaging (MRI) devices, computed tomography (CT) devices, scanners, ultrasonic devices, etc.), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include parts of furniture or buildings/structures, electronic boards, electronic signature receiving devices, projectors, or various measuring instruments (e.g., water meters, electricity meters, gas meters, or wave meters, and the like). The electronic device may be one of the above-described various devices or a combination thereof. An electronic device according to an embodiment may be a flexible device. Furthermore, an electronic device according to an embodiment may not be limited to the above-described electronic devices and may include other electronic devices and/or new electronic devices developed in the art.

Hereinafter, an electronic device according to the various disclosed embodiments may be described with reference to the accompanying drawings. The term "user" used herein may refer to a person who uses an electronic device or may refer to a device (e.g., an artificial intelligence electronic device) that uses an electronic device.

Figure 2:
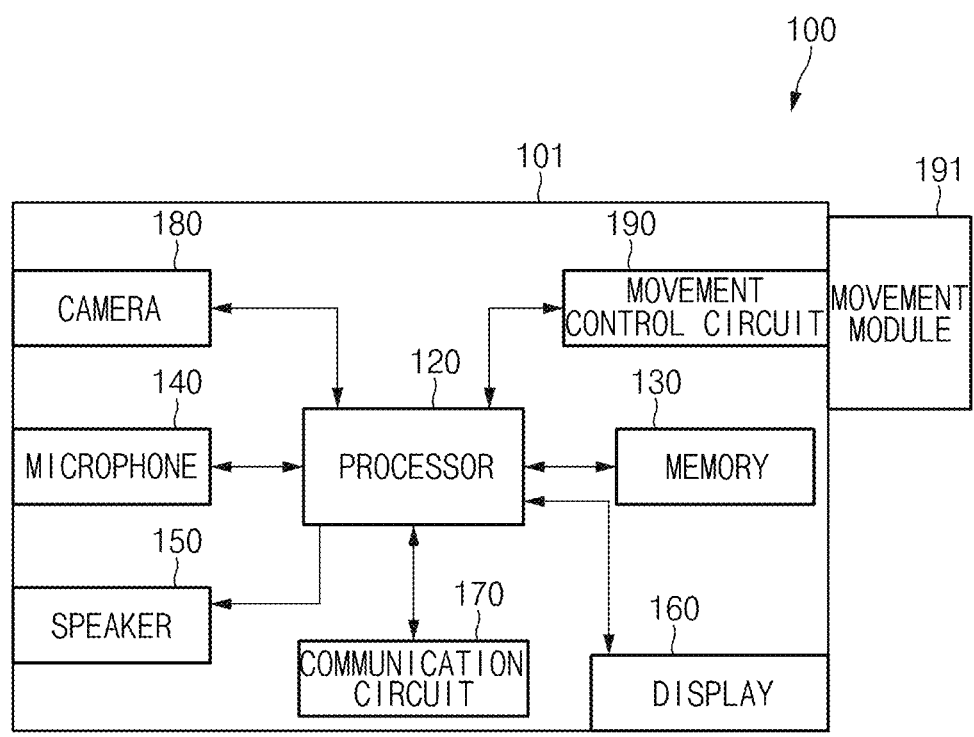
FIG. 2 is a block diagram of a home robot device, according to an embodiment of the present disclosure.

FIG. 1 is a view illustrating an operating environment of a home robot device, according to an embodiment of the present disclosure, and FIG. 2 is a block diagram of a home robot device, according to an embodiment of the present disclosure.

Referring to FIG. 1, the operating environment 1000 of the home robot device 100 according an embodiment may include a motion information providing source 10 (e.g., an external electronic device) and the home robot device 100.

The motion information providing source 10 may include at least one source. For example, one source may be a human 11 who is able to exhibit actions and/or movements, an animal 12, or an electronic device 13 that may display an object after detecting the actions and/or movements of the human 11 or the animal 12. The human 11, the animal 12, or the object displayed by the electronic device 13 may include one or more joints and a plurality of supports linked to each other through the joints. For example, in the case of the human 11, the joints may include various joints such as wrist, elbow, shoulder, neck, waist, knee, ankle, hip, finger, and toe joints. In the case of the wrist joint in the human 11, the supports may be the human's hand and forearm. Similarly, in the case of the shoulder joint in the human 11, the supports may be the human's upper arm and torso.

According to one embodiment, motion information from the motion information providing source 10 may be captured by the home robot device 100 when the home robot device 100 captures images of the motion information providing source 10 using a camera 180 and analyzes the captured images. However, the present disclosure is not so limited. For example, in another embodiment, the motion information providing source 10 may include a memory device where its motion information are stored. In this case, the home robot device 100 may establish a communication channel with the motion information providing source 10 by using a communication circuit 170 and may receive the motion information through the communication channel. The motion information may include, for example, joint information, such as information on the movement direction of a joint. The motion information may also include movement information of a support linked to at least one side of the joint. Such information may include the movement direction, the movement distance, and the movement speed of the support, the rotation direction of the support, the relative distance between the support and another support, etc.

As mentioned above, the home robot device 100 may collect the motion information from the motion information providing source 10 using the camera 180, which may be an RGB camera or a Depth camera. The home robot device 100 may transform and use the collected motion information for the body 101 of the home robot device 100. In doing so, the home robot device 100 may generate initial motion information or specified motion execution information, which are described in more detail below. Alternatively, the home robot device 100 may receive the initial motion information from an external electronic device through the communication channel.

Upon generating or receiving the initial motion information, the home robot device 100 may modify the initial motion information based on a specified algorithm such as a motion modification algorithm and may execute the modified motion. While executing the modified motion, the home robot device 100 may determine whether the user prefers the motion, and may further modify the motion based on the user's preference.

The home robot device 100 according to one embodiment may utilize, for example, motion data of the human 11 to automatically generate a natural motion that shows sympathy with the user through the feedback from the user (or by using the preference value of the user) to execute the generated motion. The natural motion may be generated by applying using a learning result (e.g., the home robot device may obtain a learning result from learning based on a specific learning algorithm. The learning based on a specific learning algorithm corresponds to obtaining a data using a device of home robot device such as camera, microphone, internet etc.) and a probability model to the initial motion information. In addition, the home robot device 100 according to one embodiment may detect motion of another home robot device and adapt that motion for its own use, even when the other home robot device and the home robot device 100 have mechanical differences between them (e.g., the home robot device 100 and the other home robot device may have different number of joint units). The home robot device 100 may generate new motion enhance the satisfaction of the user with the home robot device 100. For example, the home robot device 100 may automatically transform motion data of the human 11 into initial motion information. The home robot device 100 may then modify the initial motion information to widen the range of the motion that is able to be modified by the home robot device 100.

Referring to FIGS. 1 and 2, the home robot device 100 may include the body 101, a processor 120, the memory 130, a microphone 140, the camera 180, a movement control circuit 190, and a movement module 191. The movement module may include components such as gears, shafts, wheels, legs, arms, etc. In addition, the home robot device 100 may further include a speaker 150, a display 160, and the communication circuit 170.

The body 101 may be the main body of the home robot device 100. Portions of the body 101 may be non-metallic or metallic. The body 101 may define a housing a printed circuit board is housed. The movement module 191, the processor 120, the memory 130, the movement control circuit 190, and the like may be mounted on the printed circuit board. The body 101 may include the display 160 disposed at one side thereof, and at least a portion of the display 160 may be exposed to the exterior of the body 101. In addition, the microphone 140 and the speaker 150 may be disposed at one side or both sides of the body 101. Although FIG. 1 illustrates that the body 101 is in the form of an animal, the present disclosure is not so limited. For example, the body 101 may be in various animal forms such as birds, fishes, insects, etc. The joint unit 102 and the support 103 linked to the joint unit 102 may be disposed at one side or both sides of the body 101. The joint unit 102 may be appropriate hardware such as a rotatable socket.

The memory 130 may store instructions and data related to the operation of the home robot device 100. According to an embodiment, the memory 130 may store the motion information from the motion information providing source 10 (hereinafter "external motion information"), the initial motion information (or specified motion execution information), and the modified motion execution information. In addition, the memory 130 may include an initial motion creation application for generating the initial motion information or the specified motion execution information. The memory 130 may further include a motion modification application for modifying the initial motion based on algorithms embodied in the motion modification application. Data or applications stored in the memory 130 may be executed by the processor 120 and may be used to automatically generate and execute motions.

The microphone 140 may be provided at one side of the body 101 to collect an external audio signal. According to an embodiment, the microphone 140 may collect a voice signal from the user. The voice signal collected by the microphone 140 may be transmitted to the processor 120 and may be used to obtain emotion information of the user. The voice signal may also be used to analyze user preference. To this end, the memory 130 may store analysis algorithms for analyzing user preferences based on the voice signal.

The analysis algorithm may include instructions that extract a voice feature vector from the voice signal. The extracted voice feature vector may be compared to an emotion table previously stored in the memory 130, so that the emotion of the user and the user preference may be determined. The emotion table may correspond emotions with certain statistical and/or mathematical features of the voice feature vector.

According to one embodiment, the home robot device 100 may store the determined emotions in order to learn the emotions of the user. Thus, when a new voice signal is received and a new voice feature vector is generated, the home robot device 100 may compare the new voice feature vector with previously learned emotions. The microphone 140 may be turned on for a specified time under the control of the processor 120 or may be in an always-on state. For example, the microphone 140 may be activated under the control of the processor 120 after the home robot device 100 executes a specified motion and may be used to collect the voice of the user.

The speaker 150 may be provided at one side of the body 101 to output sounds. The speaker 150 may output a specified audio signal under the control of the processor 120. For example, the speaker 150 may output various types of audio information (e.g., the crying sound of an animal, or the like) stored in the memory 130. The memory 130 may store multiple pieces of audio information corresponding to various user emotions. For example, the memory 130 may store an audio signal having a specific tone that represents an emotion. These audio signals may be compared with the aforementioned voice feature vectors to determine the user's emotion.

Audio information outputted by the speaker 150 may include first audio information that expresses pleasure of the home robot device 100, second audio information that expresses boredom of the home robot device 100, third audio information that expresses depression or sadness of the home robot device 100, and fourth audio information that may be outputted when an emotion change is detected in the user. These various pieces of audio information may be mapped to various motions executed by the home robot device 100 and may be output when the home robot device 100 executes the motion.

According to an embodiment of the present invention, since the home robot device 100 may be designed to execute a new motion almost every time, the multiple pieces of audio information may be mapped depending on sections of an action range (e.g., sections obtained by dividing the size or the speed of the action in the unit of a specific size, in relation to the movement range (e.g., an arm swing width, a head swing width, or a stride) of the home robot device 100). For example, a particular piece of audio information may be mapped to when an arm of the home robot device 100 includes at least one arm and may swing the arm in the range of a first angle to a second angle, the sections of the action range may include sections obtained by dividing the range of the first angle to the second angle in the unit of 10 degrees or more. In another example, another piece of audio information may be mapped to when the home robot device 100 moves by 5 cm, 10 cm, or the like about at least two legs and the stride between the two legs is 50 cm, the sections of the action range may include sections obtained by dividing the action range in a specific unit.

The output level and the output time interval of the audio signal may also be dependent on the magnitude of the movement. For example, when the movement of the home robot device 100 is relatively large, the output level of the audio information may be relatively high and the output time interval of the audio information may be relatively long. In contrast, when the movement of the home robot device 100 is relatively small, the output level of the audio information may be relatively low and the output time interval of the audio information may be relatively short.

The display 160 may output at least one screen related to the operation of the home robot device 100. For example, the display 160 may output texts and images corresponding to present state information (e.g., pleasant, sad, bored, or depressed, etc.) of the home robot device 100. The display 160 may output specified information while the home robot device 100 executes a specified motion. The display 160 may be turned off when the home robot device 100 is not moving. In one embodiment, after the home robot device 100 executes a specific motion, the display 160 may menu items that allow the user to select a user preference. If a user preference is selected by the user, the display 160 may transmit, to the processor 120, the information on the selected user preference. To this end, the display 160 may include an input device such as a touch input detector. Accordingly, the display 160 may be a touch screen. In another embodiment, the display 160 may be omitted from the home robot device 100.

The communication circuit 170 may process functions related to the communication function of the home robot device 100. According to an embodiment, the communication circuit 170 may establish a communication channel with an external electronic device in order to receive initial motion information for the home robot device 100. To establish the channel, the communication circuit 170 may scans the area surrounding the home robot device 100 for a specific time period. During the scan, the communication circuit 170 may detect an external electronic device near the home robot device 100, or may determine whether an external electronic device is approaching the home robot device 100 by measuring the reception intensity of a wireless signal transmitted by the external electronic device. Once the external electronic device is detected, the communication circuit 170 may transmit a signal to the processor 120 indicating the detection. In another example, the communication circuit 170 may be linked to an Internet-connected door lock system. When the door lock is released, the communication circuit 170 may receive a door lock release signal. The received door lock release signal may be transmitted to the processor 120. In yet another example, the communication circuit 170 may establish a communication channel with an Internet-connected refrigerator. When, for example, the door of the refrigerator opens or closes, the relevant information may be transmitted to the processor 120.

The camera 180 may be disposed at one side of the body 101, for example, on the "head" of the body 101 when the body 101 is in the shape of an animal. If a pre-specified condition is satisfied, the camera 180 may be activated to capture an image and to transmit the captured image to the processor 120. For example, the camera 180 may be activated when the communication circuit 170 transmits the signal indicating a nearby external device has been detected. The image captured by the camera 180 may be transmitted to the processor 120 and the processor 120 may determine whether the image contains the face of the user. The camera 180 may obtain images containing the face of the user while the movement module 191 executes specific motions under the control of the movement control circuit 190. Therefore, the direction of the camera 180 may be controlled to correspond to the movements executed by the movement module 191, such that the facial part of the user is tracked while the home robot device 100 executes the movement. The facial information of the user acquired by the camera 180 may be used to analyze user preference or user emotion. If the home robot device 100 stops moving, the camera 180 may be deactivated. The images acquired by the camera 180 may include, for example, images capturing the facial expressions of the user and images capturing the movements of the user's body. The processor 120 may extract facial feature vectors and/or movement vectors from the images and may estimate user preferences based on the vectors.

The movement module 191 may a motor that drives the movement of the home robot device 100, the joint unit 102 linked to the motor, and the support 103 linked to the joint unit 102. For example, the motor may actuate the support 103 to rotate about the joint unit 102 or may actuate the support 103 to extend it. To this end, the support 103 may be provided so that it can extend or contract when actuated by the motor. According to another embodiment, the movement module 191 may also include wheels or tracks linked to the motor so that the movement module 191 can rotate the joint unit 102.

The movement control circuit 190 may control the movement module 191 to allow the home robot device 100 to execute a specified motion. To this end, the movement control circuit 190 may receive motion execution information from the processor 120 and may transmit, to the movement module 191, a control signal corresponding to the received motion execution information. The control signal controls the movements of the joint unit 102 and support 103.

The processor 120 may perform the signal processing for the control of the home robot device 100. For example, for the motion control of the home robot device 100, the processor 120 may transmit initial motion information (or specified motion execution information) stored in the memory 130 to the movement control circuit 190. Accordingly, the home robot device 100 may execute an initial motion. The processor 120 may activate the camera 180 while the home robot device 100 executes the initial motion and may analyze images captured by the camera 180 to collect user preference and user emotion. The processor 120 may then generate a new action pattern (or modified motion execution information) based on the acquired user preference or user emotion and may transmit the new action pattern (or the modified motion execution information) to the movement control circuit 190. The movement control circuit 190 may then transmit the new action pattern to the movement module 191 so that the home robot device 100 perform the new movement.

As described above, the processor 120 may create the initial motion information, process learning, and automatically create new motions. On the other hand, the initial motion information may be a factory setting that is stored in the memory 130 before the home robot device 100 is purchased. In this case, the processor 120 may not create the initial motion information. The processor 120 may include elements illustrated in FIG. 3 to control the movement of the home robot device 100.

Figure 3:
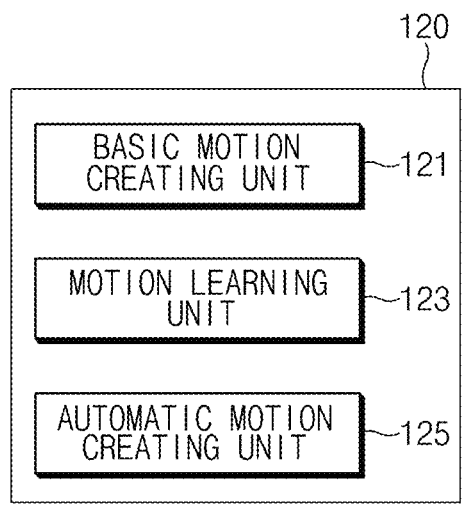
FIG. 3 is a block diagram of a processor of a home robot device, according to an embodiment of the present disclosure.

FIG. 3 is a block diagram of a processor of a home robot device, according to an embodiment of the present disclosure.

Referring to FIG. 3, the processor 120 of the home robot device 100 may include a basic motion creating unit 121, a motion learning unit 123, and an automatic motion creating unit 125. At least one of the basic motion creating unit 121, the motion learning unit 123, and the automatic motion creating unit 125 may be provided in hardware. Also, at least one of the basic motion creating unit 121, the motion learning unit 123, and the automatic motion creating unit 125 may be provided as an independent processor and may communicate with the processor 120 to perform signal processing related to controlling the movement of the home robot device 100.

The basic motion creating unit 121 may collect external motion information using the camera 180. For example, the basic motion creating unit 121 may collect external motion information of a specified object (e.g., human, animal, or another object making a specified movement) from images captured by the camera 180. The external motion information may include, for example, the number of joints, the number of supports linked to the joints, the positions of the joints, the movement directions of the joints linked to the supports that are moving, the movement directions and distances of the supports, the moving speeds of the supports, etc. The basic motion creating unit 121 may generate initial motion information (or specified motion execution information) based on the collected external motion information. For example, when the number of joint units and supports of the home robot device 100 is less than the number of joints and supports in the external motion information, the basic motion creating unit 121 may perform reduction (or contraction) mapping between the number of joints and supports included in the external motion information and the number of the joint units and supports of the home robot device 100. In contrast, when the number of joint units and supports of the home robot device 100 is greater than the number of joints and supports in the external motion information, the basic motion creating unit 121 may perform expansion mapping between the number of joints and supports included in the external motion information and the number of the joint units and supports of the home robot device 100. For example, 21 joints and 45 supports may be present in the external motion information and the home robot device 100 may have 7 joint units and 15 supports. In this case, the basic motion creating unit 121 may map the joints and supports included in the external motion information with the joint units and supports of the home robot device 100 at the ratio of 3:1.

According to one embodiment, the joint of a particular body part in the external motion information may be mapped to the corresponding joint in the home robot device 100 by the basic motion creating unit 121. For example, through image analysis, the basic motion creating unit 121 may determine joints of the head, each arm, and each leg. These joints may be contraction-mapped or 1:1 mapped with the joint units of the head, the arms, and the legs of the home robot device 100. After the contraction mapping or 1:1 mapping, the basic motion creating unit 121 may generate the initial motion information (or specified motion execution information) based on the movement of the joint and the support included in the external motion information. The initial motion information can then be applied to the movement module 191 so that the home robot device 100 duplicates the movement in the external motion information. However, when the initial motion information is a factory setting that is stored in the memory 130 before the home robot device 100 is purchased, the basic motion creating unit 121 may be omitted and the creation of the initial motion may be omitted.

The motion learning unit 123 may control the home robot device 100 to execute the motion according to the initial motion information in response to detecting that a specified event has occurred or a specified condition has been satisfied. For example, the motion learning unit 123 may activate the microphone 140 and may determine whether a specified voice signal (e.g., a voice signal calling the home robot device 100) is detected. In addition, the motion learning unit 123 may determine whether the user approaches within a specified distance, for example by detecting a door lock release signal from the door lock system that is communicatively linked with the communication circuit 170.

If the specified event occurs or the specified condition is satisfied, the motion learning unit 123 may activate the camera 180 to detect the position of the user. Alternatively, the motion learning unit 123 may detect the position of the user by determining the position of the electronic device held by the user by using the communication circuit 170. In another example, the motion learning unit 123 may determine the position of the IoT device that provided the relevant signal as the position of the user. For example, when the specified condition is reception of the door lock release signal, the motion learning unit 123 may determine the position of the door lock as the position of the user. If the position of the user is determined, the motion learning unit 123 may cause the home robot device 100 to approach the position of the user and execute the motion according the initial motion information.

The motion learning unit 123 may collect the information on user preferences and user emotions information of the user after performing the motion according to the initial motion information. Afterwards, the motion learning unit 123 may acquire a facial image of the user by using the camera 180 and may analyze the acquired facial image of the user. The motion learning unit 123 may determine the present emotion state of the user based on the analyzed information. In this operation, the motion learning unit 123 may compare the analyzed information with previously stored emotion data to determine that the user emotion is a previously-recognized emotion, may determine the user information as a new emotion, or may presume the emotion state of the user. In comparing the analyzed information with previously stored emotion data, the motion learning unit 123 may use an emotion table where facial vectors are mapped to specific emotions.

In another embodiment, the motion learning unit 123 may collect a voice signal uttered by the user by using the microphone 140 and may analyze the characteristic of the collected voice signal. The motion learning unit 123 may determine the user preferences or the user emotions based on the analyzed characteristics of the voice signal. In doing so, the motion learning unit 123 may use an emotion table where features of voice signals are mapped to specific emotions. The motion learning unit 123 may transmit the determined user preferences and user emotions to the automatic motion creating unit 125.

The automatic motion creating unit 125 may automatically generate a new motion to be executed, based on the probability model of the initial motion, which is explained in more detail below, and learned parameters such as the determined user preferences and user emotions. For example, the automatic motion creating unit 125 may change the motion to be executed by the home robot device 100 depending on the preferences and emotions of the user. To change the motion, the automatic motion creating unit 125 may generate new motion execution information by using the probability model of the initial motion. According to an embodiment, the automatic motion creating unit 125 may generate the motion execution information by regulating the rotational movements and/or the sizes of the joint units, the movement distances of the supports, the movement directions of the supports, the movement speeds of the supports, etc. The motion execution information, which is newly generated, may be transmitted to the motion learning unit 123, and the motion learning unit 123 may execute the motion according to the new motion execution information. Alternatively, the new motion execution information may be transmitted to the movement control circuit 190 for execution.

According to one embodiment, the processor 120 (e.g., the motion learning unit 123) may use the microphone 140 when controlling the home robot device 100. For example, if an audio signal corresponding to the user's voice has been collected from the microphone 140, the processor 120 may activate the camera 180 and may determine whether the specified user is present within a specified distance. Afterwards, the processor 120 may analyze the images captured by the camera 180 to determine facial features of the user captured within the images. If the specified user is present within the specified distance, the processor 120 may control the movement module 191 so that the home robot device 100 approaches the user. When the home robot device 100 is in position, it may execute the motion according to the initial motion information. During this operation, the processor 120 may output audio information mapped with the initial motion information.

In addition, the processor 120 may output specified audio information corresponding to the emotions of the user. To this end, the processor 120 may determine the type of the audio information corresponding to the emotion of the user, output the audio information of the determined type, and analyze the subsequent emotion of the user within a specified time interval after the output. For example, the processor 120 may detect that the user is sad or depressed. The processor 120 may then determine that the corresponding type of audio information is the aforementioned first audio information that expresses pleasure of the home robot device 100. The processor 120 may then cause the speaker 150 to output the first audio information in an attempt to make the user feel better. The processor may analyze the subsequent emotion of the user by for example analyzing the facial expressions of the user after outputting the music. If the subsequent emotion state of the user is analyzed to be more cheerful, the processor 120 may continue to output the first audio information.

Alternatively, if the subsequent emotion state of the user is analyzed to be the same or not more cheerful, the processor 120 may stop the output the first audio information and may instead output the aforementioned third audio information that expresses depression or sadness of the home robot device 100. The above-described audio output may be executed for a specified time interval or may be repeatedly executed whenever a specified wake-up word (e.g., a voice signal calling the home robot device 100) is detected.

Figure 4:
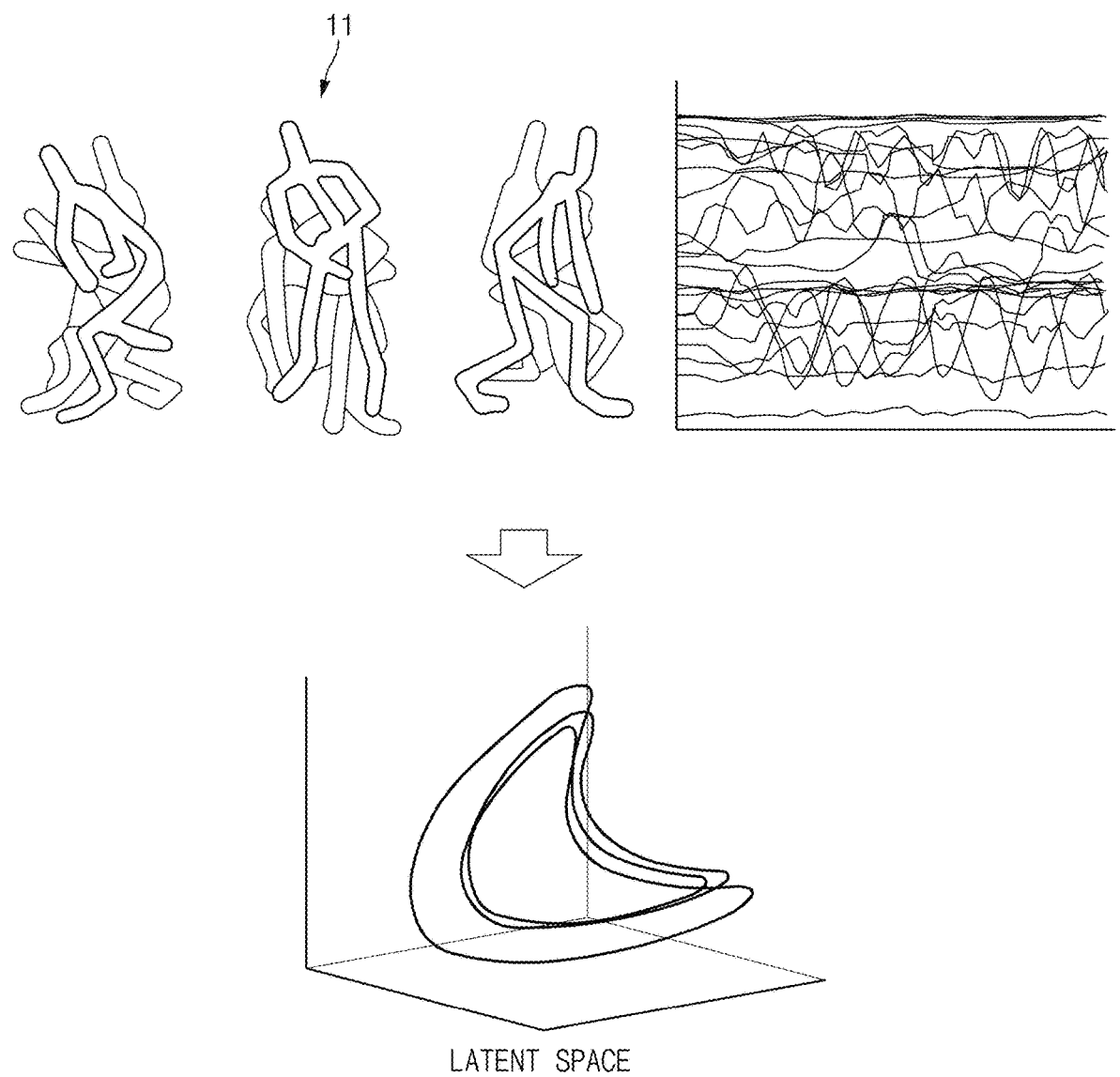
FIG. 4 is a view illustrating motion transformation by a home robot device, according to an embodiment of the present disclosure.

FIG. 4 is a view illustrating a motion transformation by a home robot device, according to an embodiment of the present disclosure.

Referring to FIG. 4, the home robot device 100 may transform, for example, motion data of the human 11 into robot motion data. The home robot device 100 may capture images of the human 11 using the camera 180, and may analyze the captured images to generate the motion data of the human 11, or may receive the motion data (e.g., video data) of the human 11 stored in another external electronic device, such as a web-server.

The motion data of the human 11 may include external motion information for the human 11. The external motion information may be represented as the positions of joints of the human body or joint angles. The home robot device 100 may learn time-series information of the joints, which are included in the external motion information based on a machine learning algorithm and may transform the time-series information into a joint angle of a robot having a mechanical feature different from that of the human 11 while maintaining the feature of the human motion as much as possible (or at less than a preset ratio range). According to an embodiment, the home robot device 100 may learn the external motion information based on a machine learning algorithm and may transform the motion data of the human 11 into motion data for the home robot device 100 that the home robot device 100 can execute. The motion data of the human 11 can be transformed into motion information for the home robot device 100 even when the home robot device 100 is anatomically different from the human 11, such that the movement of the home robot device 100 mimics the movement of the human 11. For example, the home robot device 100 may transform the motion data of the human 11 by mapping the movement of each part of the human 11 to a corresponding part of the home robot device 100, e.g. movement of the forearm of the human 11 is mapped to the bottom leg portion of the home robot device 100, if the home robot device 100 is in the shape of a dog. Thus, because a joint or support of the home robot device 100 moves in a manner similar to the corresponding joint or support of the human 11. According to an embodiment, the home robot device 100 may employ the information on the movement angle, the movement speed, and the movement distance of a specific joint of the human 11 by mapping the information with each robot part or by randomly mapping the information with the specific robot joint. Even if the robot joint, which is placed at a position different from the position of the joint of the human 11, moves through a way of randomly mapping, since the robot joint moves in a manner similar to the movement of the specific joint of the human 11 when the robot joint is similar the specific joint of the human 11, the user may recognize the movement manner of the robot joint as a natural movement manner.

In another example, the range of motion for the human 11 may be greater than the range of motion for the home robot device 100. Accordingly, the home robot device 100 may also contract the motion data of the human 11 so that the corresponding motion can be executed by the home robot device 100. For example, the home robot device 100 may compress the human motion onto a latent space corresponding to the number of motors of the home robot device 100 as illustrated in FIG. 4. Accordingly, even if the mechanical characteristics of the home robot device 100 are different from the human 11, the home robot device 100 may execute motion that is similar to the motion of the human 11. The processor 120 (e.g., the basic motion creating unit 121) of the home robot device 100 may configure a robot motion, which is made by a designer or an animator, as a basic motion without using motion data of the human 11 while creating initial motion information (or specified motion execution information). If necessary, the home robot device 100 may use the mixture of the motion data of the human 11 and the robot motion. FIG. 4 illustrates that the motion data of various joints of the human 11 are mapped on the latent space.

In sum, when a user (e.g. the human 11) is specified, the processor 120 (e.g., the basic motion creating unit 121) of the home robot device 100 may observe the movement of the user by using the camera 180, and may extract movement information of the user based on the observation. In this operation, the processor 120 may also collect emotion information of the user from the facial expression or the voice of the user. For example, the processor 120 may collect specific emotion information (e.g., emotion information obtained through the face analysis) of the user to modify the motion information to be executed by the home robot device 100. In addition, the processor 120 may also collect emotion information of the user after the home robot device 100 performs its motion to determine the user's reaction to the movement.

Figure 5:
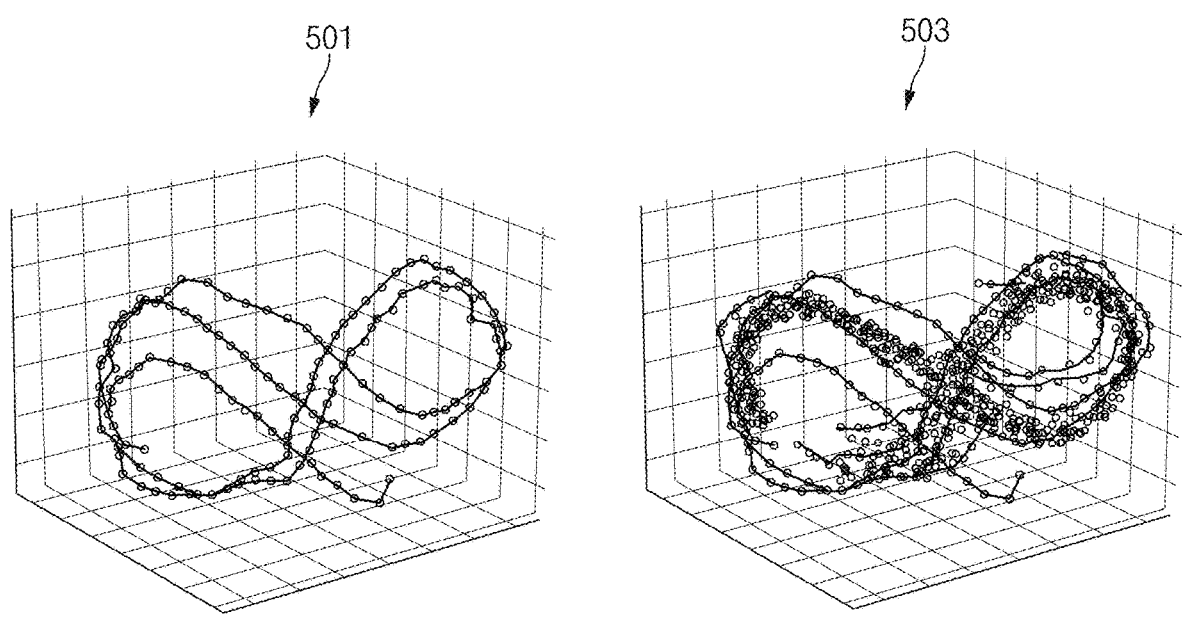
FIG. 5 is a view illustrating motion modification of the home robot device, according to an embodiment of the present disclosure.

FIG. 5 is a view illustrating a motion modification by a home robot device, according to an embodiment of the present disclosure.

Referring to FIG. 5, the processor 120 (e.g., the motion learning unit 123) of the home robot device 100 may execute the motion according to the initial motion information (or the specified motion execution information). The motion of the home robot device 100 can then be modified according to user preference. In this operation, the processor 120 of the home robot device 100 may modify the motion without greatly changing the features of the motion by using a Lie group operation such as rotation, translation, scaling, or the like. Alternatively, the processor 120 may add specific noise to the motion based on nonlinear temporal sequence mapping. For example, reference number 501 indicates a representative motion sequence which was designed in advance and reference number 503 indicates the modified motion, which resulted from the addition of a specific noise to the representative motion sequence in order to smooth out the motion.

Figure 6:
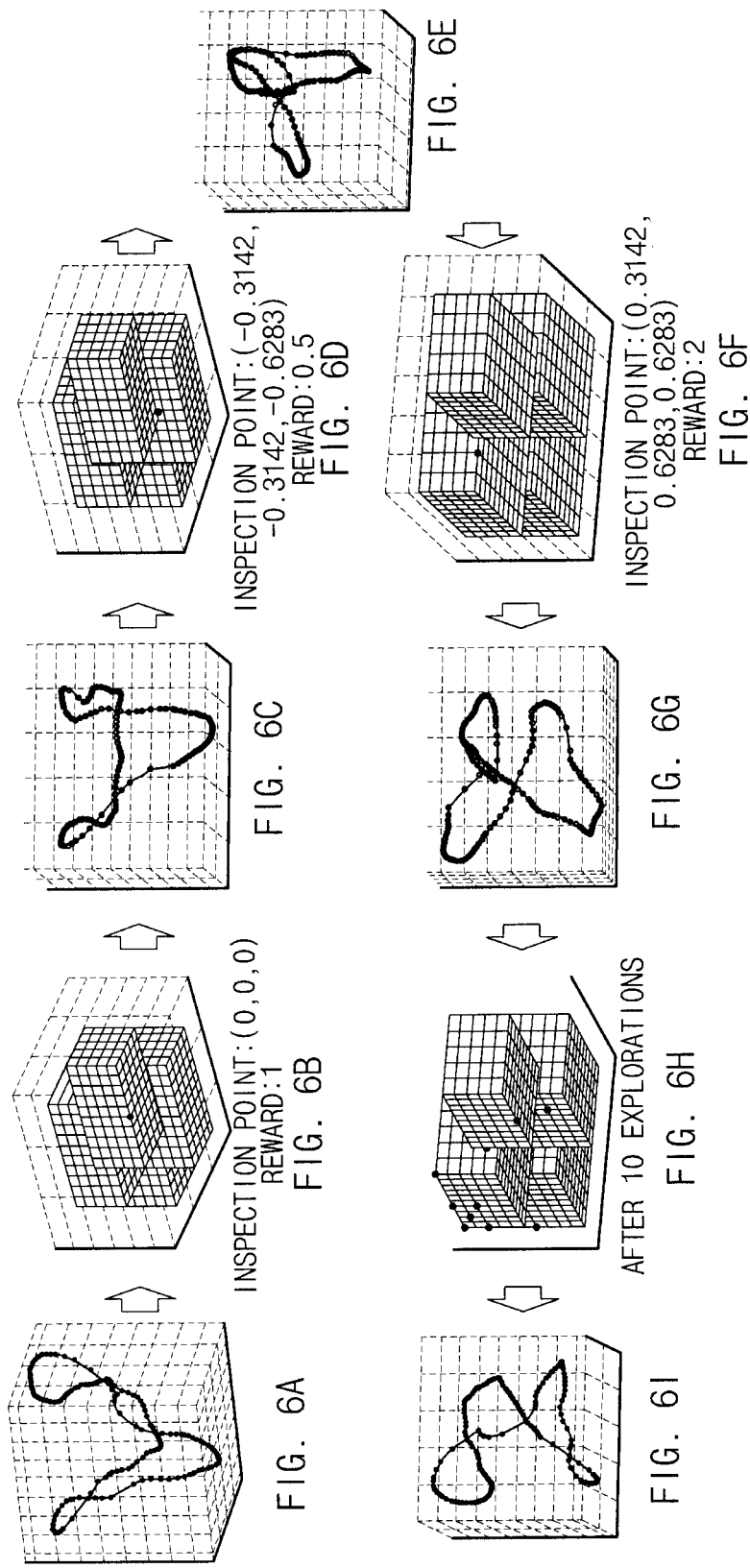
FIG. 6(*a*)-(*i*) is a graph illustrating another motion modification of the home robot device, according to an embodiment of the present disclosure.

FIG. 6(*a*)-(*i*) are views illustrating another motion modification by a home robot device, according to an embodiment of the present disclosure.

Referring to FIG. 6, as described above, the processor 120 (e.g., the motion learning unit 123) of the home robot device 100 may automatically modify the robot motion after detecting the user's reaction to the motion. In this operation, the processor 120 of the home robot device 100 may detect the facial expression of the user and assign a user preference to the facial expression. For example, the processor 120 may analyze the facial expression of the user after extracting coordinates of facial feature points of the user using the camera 180. The facial feature points are then compared with facial feature points previously stored in the emotion table, and the user preference corresponding to a similar facial feature point pattern may be determined to be the current user preference. Alternatively, the processor 120 of the home robot device 100 may estimate the user preference through the voice of the user. For example, the processor 120 may extract a voice feature vector of the user using the microphone 140. The voice feature vector is then compared with voice feature vector previously stored in the emotion table, and the user preference corresponding to a similar voice feature vector may be determined to be the current user preference. The processor 120 may analyze changes in the emotion of the user by applying progressive vector analysis models such as the Bayesian regression model or the recurrent neural network (RNN) model. The processor 120 of the home robot device 100 may transform the estimated user preference into a score, and use the score in the machine learning model. For example, if a desired user emotion is detected after the home robot device performs a particular motion, that motion may correspond to a high score. The processor 120 of the home robot device 100 may widen the range of the motion that is able to be modified by the home robot device 100 in various manners and may perform a time-series analysis (e.g., the optimal motion is searched by Bayesian optimization in real time whenever a reward value is input). Accordingly, the home robot device 100 may modify the robot motion to enhance the user experience.

The processor 120 of the home robot device 100 maps the modified motion with the emotion state of the user and stores the mapping result. Then, the processor 120 of the home robot device 100 may reuse the mapping result when a similar emotion state of the user occurs thereafter, thereby creating customized motions specialized to the preferences or tastes of the individual user. In this way, the home robot device 100 may perform motions that may affect the emotional state of the user. In detecting the user preference after executing a motion, the processor 120 of the home robot device 100 may detect the user preference a specified number of times and may generate a preference distribution based on the data set. For example, the processor 120 of the home robot device 100 may collect user preference 10 times after execution of a motion and may estimate a user preference distribution using these 10 data points.

As illustrated in FIG. 6, the processor 120 of the home robot device 100 may modify the motions of the home robot device 100 according to user preference by using reward values generated from the user preference. For example, the processor 120 of the home robot device 100 may collect the user preference after execution of an initial motion (a) of the home robot device 100. According to the user preference detected after the initial motion, the processor 120 may apply a first reward value (e.g., 1) to a specific first inspection point (e.g., (0, 0, 0) in FIG. 6) (or modification point according to the collected preference analysis) (see reference sign (b)) and may generate newly modified motion information (see reference sign (c)). The first inspection point is temporary point by random detecting or a predetermined point by selection of a designer. Therefore, the inspection point is able to be changed according to a statistical information or change of design. The processor 120 of the home robot device 100 may perform the newly modified motion and may collect and analyze subsequent user preference. Then, the processor 120 of the home robot device 100 may apply a second reward value (e.g., 0.5) to a specific second inspection point (e.g., the inspection point shown in reference sign (d)) according to the analysis. The processor 120 of the home robot device 100 may generate new motion information (see reference sign (e)) after applying the second reward value to the second inspection point. The processor 120 of the home robot device 100 may then perform the motion according to the motion information (see reference sign (e)) and may collect and analyze further user preference. Afterwards, the processor 120 of the home robot device 100 may apply a third reward value (e.g., 2) to a specific third inspection point (e.g., the inspection point shown in reference sign (f)) according to the analysis. The processor 120 of the home robot device 100 may then generate new motion information (g) after applying the third reward value to the third inspection point. The home robot device 100 may perform the new motion information, collect new user preferences, and apply new reward values by the specified number of times (see reference sign (h)). Then, the home robot device 100 may determine the resulting motion information (see reference sign (i)) to be the final motion.

As shown in FIG. 6, in the above described operations, the home robot device may modify its motion by dividing its motion space into four quadrants. Then, the home robot device 100 may perform processing such that the motion modification is concentrated toward the space having the higher user preference value (e.g., a large reward value) (or may perform processing such that the weight of the motion modification is concentratedly applied to a motion representing the higher user preference). FIG. 6 illustrates that the reward value in the first space (a space disposed at a upper-left side of the four quadrant spaces) represents a higher value (e.g., the reward value is "2") and thus specific inspection points subject to the motion modification are concentrated in the first space. The four quadrant spaces may correspond to spaces in which weights are applied to a plurality of parts of the home robot device 100. For example, the first space in the upper-left of the four quadrant spaces may correspond to a space in which a higher weight is assigned because the head joint unit of the home robot device 100 is located there. The second space in the upper-right of the four quadrant spaces may correspond to the space in which a higher weight is assigned because a waist joint unit of the home robot device 100 is located there. Two spaces in the lower-left and lower-right of the four quadrant spaces may correspond to spaces in which higher weights are assigned because the arm joint unit and the leg joint unit of the home robot device 100 are located there. The weight may be determined based on a user preference. For example, the home robot device 100 may allow a factor for bigger movements of the head joint unit if a user preference of the head joint unit is higher a user preference of the arm joint unit. The mapping for each part of the home robot device 100 to the quadrants may vary depending on the design of the home robot device 100.

According to an embodiment, when a reward value is applied to the first space, the processor 120 of the home robot device 100 may generate motion information that more strongly emphasizes the head motion of the home robot device 100 as compared with other motions. For example, the head may perform exaggerated nodding motions while other parts of the home robot device 100, such as its feet or arms, may execute attenuated motions.

As described above, the reward value may be calculated based on the predefined emotion table. For example, a manner of calculating a reward value stored in the memory 130 of the home robot device 100 may be set such that user preference for a smile expression or a surprise expression has a score higher than that of a grimace expression or a sad expression. In addition, when the user's emotion is detected by his or her voice, the reward value for laughing may be higher than for crying. The home robot device 100 may determine the reward value by comparing collected information to the information in the previously stored emotion table.

FIG. 7 is a graph illustrating learning by a home robot device, according to an embodiment of the present disclosure.

Referring to FIG. 7, to generate modified motions, the processor 120 of the home robot device 100 may search for optimal motion only through few feedbacks (evaluations) as possible by using Bayesian optimization technology. The processor 120 of the home robot device 100 may collect user preference (or reaction) to the motion executed by the home robot device 100. To collect the user preference, the home robot device 100 may output a reward selection screen through the display 160 such that a user inputs a reward value or may output a question asking the user to select the reward value. But in other embodiments, as described above, the home robot device 100 may automatically calculate the reward value by analyzing the facial expression of the user or voice signals from the user.

If the reward value is calculated, the home robot device 100 may perform the motion modification based on the calculated reward value such that the modified motion will lead to a better user preference or reaction. After the motion modification is performed by the specified number of times (or the motion modification is performed until a specific reward value is collected), the home robot device 100 may determine finalize the motion modification. In this operation, the processor 120 of the home robot device 100 may iteratively generate new motions based on a probability model (see reference number 701) of the initial motion. The reward values are then applied to the new motions (see reference number 703). In detail, the processor 120 of the home robot device 100 may generate new motions, which are varied slightly every time, by combining a relevant initial motion (e.g., a probability mode for the initial gesture) and a parameter (e.g., a reward value) with respect to a motion instruction for an emotion such as joy or sadness or a motion instruction representing a power-on function or a power-off function. In this operation, the home robot device 100 may adjust the variation of the motion by adjusting the range (e.g. the movement distance and movement speed of the movement) of the motion.

According to various embodiments described above, a home robot device according to one embodiment may include a memory which stores motion data for a number of joints of a user, a movement module which drives movements of joint units of the home robot device, where the number of joint units is lower than the number of joints. The home robot device also includes a processor electrically connected with the memory and the movement module. The processor may be configured to contraction-map the joints for the motion data with the joint units and thus to generate initial motion information based on the movement module.

According to various embodiments, the processor may be configured to classify the positions of the joints for the motion data according to various body parts and contraction-map or 1:1 map the joints to the joint units of the home robot device.

According to various embodiments, the processor may be configured to allow the movement angle, the movement distance, and the movement direction of one or more joint units to be substantially identical to or similar to the movement angle, the movement distance, and the movement direction of one or more joints in the motion data. Making a motion of the joint unit similarly to that of a corresponding joint may mean that the movement of the joint unit is within a range of 70% to 99% to the movement of the joint.

According to various embodiments, the present disclosure may provide a home robot device. The robot device may include a memory, a movement module, and a processor electrically connected with the memory and the movement module. The processor may be configured to execute a motion based on specified motion execution information stored in the memory, obtain feedback information of a user, generate modified motion execution information by modifying at least a portion of the specified motion execution information based on the feedback information of the user, where the modified motion execution information includes a movement value of at least one joint unit of the home robot device or at least one support linked to the at least one joint unit selected from a probability model of the specified motion execution information, and execute a motion of the home robot device based on the modified motion execution information.

According to an embodiment, the processor may be configured to obtain external motion information from a motion information providing source, extract reference information included in the external motion information, wherein the reference information includes information on a number of at least one joint of the motion information providing source, a position of the at least one joint, a movement direction of the at least one joint, or a movement angle of the at least one joint, and generate the specified motion execution information based on contraction-mapping the extracted reference information to the at least one joint unit of the home robot device.

According to an embodiment, the processor may be configured to classify the at least one joint in the extracted reference information according to one or more parts of the motion information providing source, and map the at least one joint in the extracted reference information to corresponding joint units in the home robot device by corresponding the one or more parts of the motion information providing source to one or more parts of the home robot device associated with the joint units.

According to an embodiment, the processor may be configured to obtain external motion information from a motion information providing source, extract reference information included in the external motion information, wherein the reference information includes information on a number of at least one joint of the motion information providing source, a position of the at least one joint, a movement direction of the at least one joint, or a movement angle of the at least one joint, and identically map the movement direction, the movement angle, or a movement speed of the at least one joint in the reference information to the at least one joint unit of the home robot device.

According to an embodiment, the home robot device may further include at least one of a camera configured to obtain an image of the motion information providing source to acquire the external motion information and a communication circuit configured to receive the external motion information from an external electronic device.

According to an embodiment, the home robot device may further include a camera, and the processor may be configured to extract coordinates of a face feature point of the user by analyzing an image obtained using the camera, and determine emotion information by comparing the coordinates of the face feature point with coordinate data in an emotion table previously stored in the memory.

According to an embodiment, the processor may be configured to compare the emotion information of the user with a preference table stored in the memory to determine a user preference score value, or determine the user preference score value based on preference distribution information previously stored in the memory.

According to an embodiment, the processor may be configured to modify at least a portion of the specified motion execution information to increase the user preference score value.

According to an embodiment, the processor may be configured to modify the specified motion execution information by a specified number of times or more, modify the specified motion execution information until the user preference score value is a specified value or more, or modify the specified motion execution information until an inflection point, at which the user preference score value changes from positive to negative.

According to an embodiment, the home robot device may further include at least one of a camera and a microphone, and the processor may be configured to extract a facial feature vector from an image obtained by the camera or a voice feature vector from a voice signal of the user collected by the microphone, and obtain emotion information of the user by comparing the facial feature vector or the voice feature vector with data in an emotion table previously stored in the memory.

Figure 8:
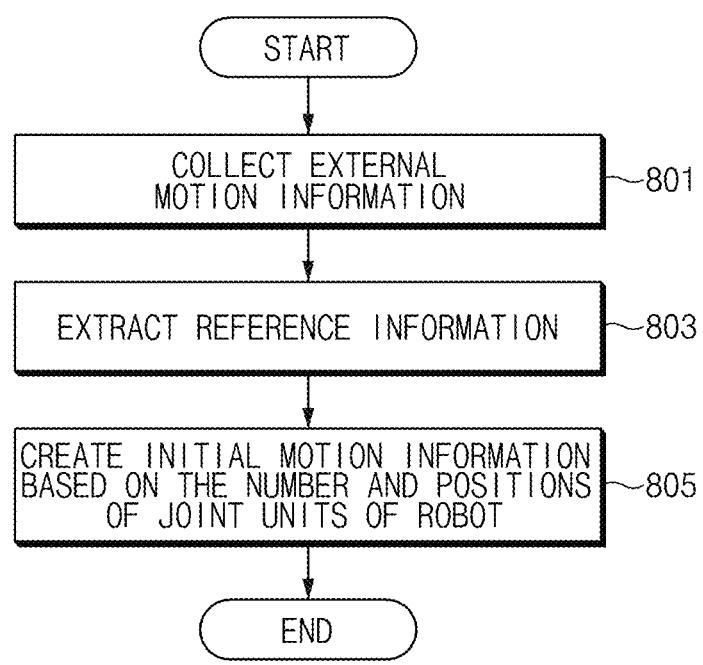
FIG. 8 is a flowchart illustrating the creation of initial motion information of the operation method for the activation of the home robot device, according to an embodiment of the present disclosure.

FIG. 8 is a flowchart illustrating the creation of initial motion information by a home robot device, according to an embodiment of the present disclosure.

Referring to FIG. 8, the processor 120 of the home robot device 100 may collect external motion information in operation 801. For example, the processor 120 (e.g., the basic motion creating unit 121) may acquire images of a subject, such as the human 11, using the camera 180. The processor 120 may then extract the motion information of the human 11 by analyzing the acquired images. In addition, the processor 120 may establish a communication channel with an electronic device having the initial motion information through the communication circuit 170 and may receive the initial motion information from the electronic device.

The processor 120 (e.g., the basic motion creating unit 121) may extract reference information from the external motion information in operation 803. For example, the processor 120 may extract information on the positions of the joints of the human 11, the movement directions of the joints, the movement speeds of the joints, the movement angle of the joints, the movements of the supports of the human 11, etc.

The processor 120 (e.g., the basic motion creating unit 121) may adapt the extracted reference information for the home robot device 100 and generate the initial motion information based on the numbers of joint units of the home robot device 100 and the positions of the joint units in operation 805. For example, the processor 120 may determine the positions of joints based on the reference information and may map the joints to the joint units of the home robot device 100. In the case that the number of joints in the reference information is larger than the number of the joint units of the home robot device 100, the processor 120 may integrate some joints with each other or may remove the some joints such that the joints of the reference information are mapped with the joint units of the home robot device 100. For example, the elbow and shoulder joints may be integrated into a single joint, and that joint may be mapped to the corresponding leg joint unit of the home robot device. If the joints of the reference information are mapped with the joint units of the home robot device 100, the processor 120 may substitute the movement speeds, the movement angles, or the movement distances of the joints to the movement speeds, the movement angles, or the movement distances of the corresponding joint units of the home robot device 100, respectively, thereby creating the initial motion information.

According to one embodiment, the processor 120 may map the minimum value and the maximum value of the movement of a joint included in the reference information with the minimum value and the maximum value the movement of a corresponding robot joint unit. The processor 120 may generate an initial probability model based on the minimum value and the maximum value of the movement of the robot joint. The processor 120 may use a value (e.g., a median value or a certain feature value) of the initial probability model as the initial motion information. The minimum value and the maximum value of the movement of the robot joint may include, for example, the maximum angle and the minimum angle of the joint in a specific direction. Since the movement degree of the joint is selected in the range of the minimum value to the maximum value at joints respectively, when the combination of the joints in movement are considered, if the home robot device have a plurality of joints, the processor 120 may generate the substantially infinite pieces of motion execution information of the home robot device 100 from the initial probability model.

The processor 120 may contraction-map supports (e.g., a finger, a hand, an arm, a head, a torso, a thigh, a shin, a foot, a toe, or a hip of the human 11) linked to joints included in the reference information with supports (e.g., a head, a body, an arm, a leg, or the like as illustrated in FIG. 1) linked to joint units of the home robot device 100. For example, the processor 120 may map the supports of the hand, finger, and arm of the human 11 with the arm of the robot. The processor 120 may map the minimum and maximum values of the movement distances or the movement angles of the supports included in the reference information with the minimum and maximum values of the movement distances or the movement angles of the supports linked to the joint units of the home robot device 100, thereby creating the initial probability model. The processor 120 may create various pieces of motion execution information by selecting movement degrees of the supports in the range of the minimum value to the maximum value of the initial probability model.

Figure 9:
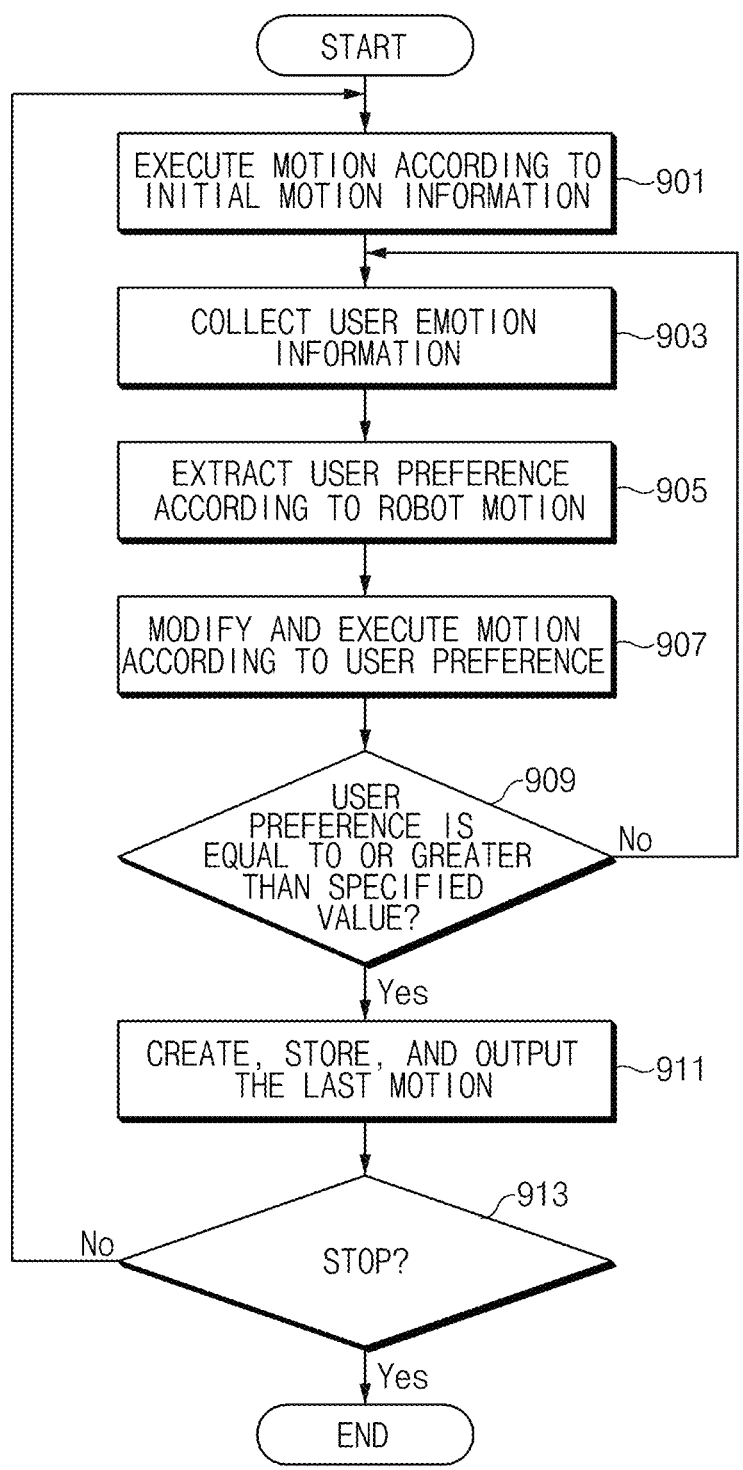
FIG. 9 is a flowchart illustrating the operation method for the activation of the home robot device, according to an embodiment of the present disclosure.

FIG. 9 is a flowchart illustrating the modification of motion by a home robot device, according to an embodiment of the present disclosure.

Referring to FIG. 9, the processor 120 (e.g., the motion learning unit 123) of the home robot device 100 may execute the motion according to the initial motion information (or the specified motion execution information) in operation 901. The initial motion information may be generated from the operations shown in FIG. 8. According to an embodiment, the initial motion information may be stored in the memory 130. In the case that multiple pieces of initial motion information is provided and the processor 120 is configured to execute the motion corresponding to specific initial motion information under a specified situation (e.g., an external environment), the processor 120 may activate at least one of the camera 180 and the microphone 140 to recognize the specified situation and may collect user information and user voice information. The processor 120 may determine the emotion state of the user based on user facial information and user voice information, which are collected, and may perform a control operation such that a specified initial motion is executed depending on the emotion state of the user. In addition, the processor 120 may determine, based on information acquired by the camera 180, a specific distance between the user and the home robot device 100 and may move the home robot device 100 closer to the user. Then, the processor 120 may execute the specified initial motion of the home robot device 100 after moving closer to the user. The initial motion information stored in the memory 130 may be updated based on user preference information to be described later. Therefore, the initial motion executed by the home robot device 100 may be varied every time depending on when the motion is executed.

In operation 903, the processor 120 may collect the user emotion information after the initial motion is executed. For example, the processor 120 may acquire the position and the facial image of the user using the camera 180. The processor 120 may extract facial feature points of the user, and may estimate the user emotion information based on a model generated from the extracted feature points. In addition, the processor 120 may compare facial feature point vectors with those in a previously-stored emotion table, and may determine the user emotion information according to the comparison result. The emotion table may include the distribution of feature points of the facial expression or models for the facial expression, and emotion information mapped with the relevant model. According to another embodiment, the processor 120 may collect the voice signals from the user by using the microphone 140 and may compare the distribution of voice feature points of the user with information stored in the emotion table to collect the emotion information of the user.

In operation 905, the processor 120 may extract user preference according to a robot motion, e.g. the motion executed according to the initial motion information. The processor 120 may extract user preference based on the user emotion information that is collected. The home robot device 100 may store a table corresponding user preference distribution information to the user emotion information. According to an embodiment, the home robot device 100 may generate and learn the user preference distribution information by using user emotion information that is previously collected. The home robot device 100 may estimate user preference based on the learned user preference distribution information if new user emotion information is received. In this operation, the processor 120 of the home robot device 100 may collect user emotion information according to the change in the user emotion for a specified time and may estimate the user preference based on the collected user emotion information. The processor 120 may acquire user preferences based on modeling schemes such as Bayesian regression or RNN. The processor 120 may estimate the user preference from facial expressions and voice signals from the user.

In addition, according to one embodiment, the home robot device 100 may store a preference table having specific scores that correspond to various user emotions. Alternatively, according to another embodiment, the processor 120 may output a user interface for collecting a user preference on the display 160. If a user input is received through the screen interface displayed on the display 160, the processor 120 may collect the user preference information corresponding to the user input. In addition, the processor 120 may output a question related to the user preference through the speaker 150 and may collect the user preference by detecting a user answer through the microphone 140.

In operation 907, the processor 120 may modify and execute a motion according to the user preference. According to an embodiment, the processor 120 may generate new motion execution information by modifying at least a portion of previous motion execution information (e.g., initial motion information) according to the user preference. For example, the modified motion execution information may be to increase the movement of the head of the home robot device 100.

In operation 909, the processor 120 may determine whether the user preference is equal to or greater than a specified value. If the user preference is less than the specified value, the processor 120 may return to operation 903 and may re-perform operations subsequent to operation 903. If the user preference is equal to or greater than the specified value, the processor 120 may generate, store, and output the last-performed motion of the home robot device 100 in operation 911. Accordingly, the processor 120 may learn and generate motion information corresponding to the specific user preferences or emotions of an individual user. If new user emotion information is collected, the processor 120 may estimate the user preference for the new user emotion information based on the learned preference distribution information.

The processor 120 may previously store a preference table for transforming the user preference into scores and may collect user preference values based on the preference table. According to one embodiment, the processor 120 may determine a change in the user preference for a specific motion of the home robot device 100. If the change is from good (e.g. happy) to bad (e.g. sad), the processor 120 may store the motion execution information. Thereafter, the processor 120 may perform the motion depending on the determined user emotion information.

In operation 913, the processor 120 may determine whether the end of the robot motion occurred. If not, the processor 120 may return to operation 901 and may perform operations subsequent to operation 901. If so, the processor 120 may stop the robot motion. For example, the processor 120 may stop the robot motion after executing the initial motion and modifying the motion by a specific number of times. In addition, if the home robot device 100 can no longer detect the face of the user using the camera 180, the processor 120 may stop the robot motion. Alternatively, after receiving a voice signal calling the home robot device 100, the processor 120 may perform a specified motion for a specified time. If the processor 120 fails to receive another voice signal of the user for the specified time while executing the specified motion, the processor 120 may stop the motion. Alternatively, the processor 120 may stop the motion of the robot if receiving a voice signal requesting the stop of the motion. To stop the robot motion, the processor 120 may temporarily stop all motions, stop movements of parts step by step, or stop the robot motion by gradually decreasing the degree and the speed of the movement of the home robot device 100. In addition, when stopping the robot motion, the processor 120 may move to a specified position and may stop the robot motion while making a specified posture.

Figure 10:
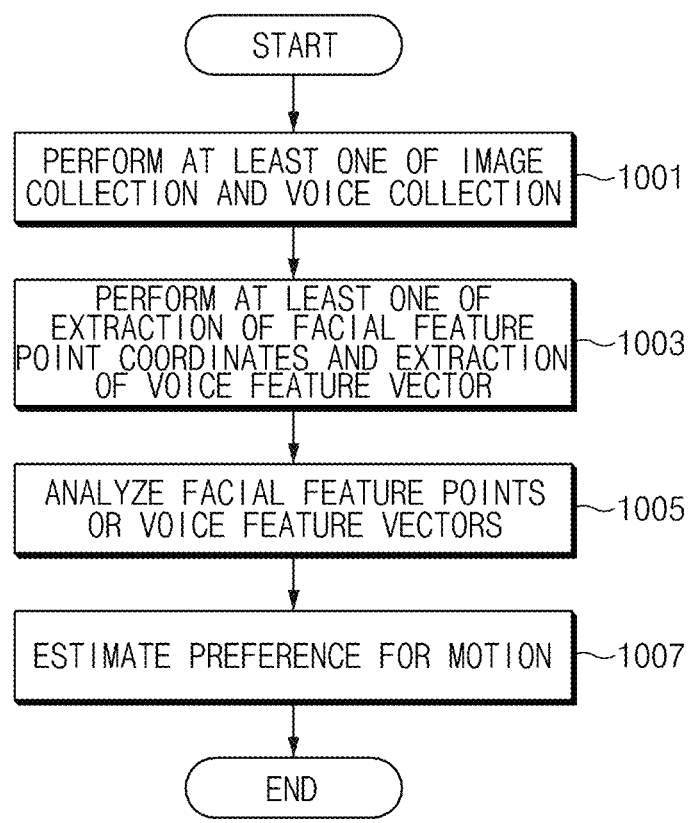
FIG. 10 is a flowchart illustrating the collection of user preference information, according to an embodiment of the present disclosure.

FIG. 10 is a flowchart illustrating the collection of user preference information by a home robot device, according to an embodiment of the present disclosure.

Referring to FIG. 10, the processor 120 of the home robot device 100 may perform at least one of image collection and voice collection in operation 1001.

In operation 1003, the processor 120 may perform at least one of extraction of facial feature point coordinates and extraction of voice feature vectors. For example, the processor 120 may extract feature points by analyzing the images acquired by the camera 180. According to an embodiment, the processor 120 may extract coordinate information of feature points of parts of the facial image, such as an eye area, a lip area, or a forehead area. The coordinates of these points may change during a facial expression. In addition, the processor 120 may extract feature vectors representing voice features from a user voice signal. In this case, the processor 120 may perform voice recognition for the voice signal and may collect information on the type of the voice signal uttered by the user.

In operation 1005, the processor 120 may analyze the facial feature points or the voice feature vectors. For example, according to an embodiment, the processor 120 may determine the type of a facial expression which is currently made by the user using coordinate information of the feature points, the previously-stored emotion distribution data, or the previously-stored emotion table. In this operation, after the motion of the home robot device 100 is performed, the processor 120 analyzes the change in the facial expression information of the user, for example, by using Bayesian Regression analysis or an RNN modeling-based analysis.

Regarding the analysis of the voice feature vectors, the processor 120 may determine, by applying Bayesian Regression analysis or RNN modeling-based analysis, a user emotion state from the voice feature vectors. For example, regarding the application of the Bayesian regression, the processor 120 may perform regression to generate a reward value from a sequence of emotion values detecting during a specified time interval. The processor 120 may calculate an equation (e.g., a preference function or a reward function) from data distribution in the regression analysis procedure.

According to various embodiments, the processor 120 may analyze the emotion of the user from the facial expression of the user through the RNN modeling-based analysis scheme, may label a reward according to the emotion change data, and may calculate the function (or the preference function) of the reward according to the emotion change or the function of the reward for the time-series facial expression/voice vector. In this operation, the processor 120 may perform labeling by using a facial expression detection value (e.g., smile detector) regarding the Reward labeling. Regarding the facial expression detection, the processor 120 may detect reward values in time series by applying specified time-series functions for emotion vectors collected in time series.

In operation 1007, the processor 120 may estimate the preference for the motion. For example, the home robot device 100 may acquire emotion information from the facial or voice analysis and may estimate a user preference value based on the acquired emotion information. The home robot device 100 may store the emotion table in memory 130 in advance and may manage the emotion table.

According to various embodiments, the present disclosure may provide an operation method for a home robot device. The operation method may include executing a motion of the home robot device based on specified motion execution information stored in a memory, obtaining feedback information of a user, generating modified motion execution information by modifying at least a portion of the specified motion execution information based on the feedback information of the user, where the modified motion execution information includes a movement value of at least one joint unit of the home robot device or at least one support linked to the at least one joint unit selected from a probability model of the specified motion execution information, and executing a motion of the home robot device based on the modified motion execution information.

According to an embodiment, the operation method may further include generating the specified motion execution information, where the generating of the specified motion execution information may include obtaining external motion information from a motion information providing source, extracting reference information included in the external motion information, wherein the reference information includes information on a number of at least one joint of the motion information providing source, a position of the at least one joint, a movement direction of the at least one joint, or a movement angle of the at least one joint, and generating the specified motion execution information based on contraction-mapping the extracted reference information to the at least one joint unit of the home robot device.

According to an embodiment, the obtaining of the external motion information may include at least one of obtaining an image of the motion information providing source using a camera, and obtaining the external motion information from an external electronic device using a communication channel established between the home robot device and the external electronic device.

According to an embodiment, the generating of the specified motion execution information further may include classifying the at least one joint in the extracted reference information according to one or more parts of the motion information providing source, and mapping the at least one joint in the extracted reference information to corresponding joint units in the home robot device by corresponding the one or more parts of the motion information providing source to one or more parts of the home robot device associated with the joint units.

According to an embodiment, the operation method may further include generating the specified motion execution information, where the generating of the specified motion execution information may include obtaining external motion information from a motion information providing source, extracting reference information included in the external motion information, wherein the reference information includes information on a number of at least one joint of the motion information providing source, a position of the at least one joint, a movement direction of the at least one joint, or a movement angle of the at least one joint, and identically map the movement direction, the movement angle, or a movement speed of the at least one joint in the reference information to the at least one joint unit of the home robot device.

According to an embodiment, the obtaining of the feedback information of the user may include activating a camera, extracting coordinates of a face feature point of the user by analyzing an image obtained using the camera, and determining emotion information of the user by comparing the coordinates of the face feature point with coordinate data in a previously stored emotion table.

According to an embodiment, the obtaining of the feedback information of the user further may include comparing the emotion information of the user with a previously stored preference table to determine a user preference score value, or determine the user preference score value based on previously stored preference distribution information.

According to an embodiment, the generating of the modified motion execution information may further include modifying at least a portion of the specified motion execution information to increase the user preference score value.

According to an embodiment, the generating of the modified motion execution information may further include one of modifying the specified motion execution information by a specified number of times or more, modifying the specified motion execution information until the user preference score value is a specified value or more, or modifying the specified motion execution information until an inflection point, at which the user preference score value changes from positive to negative.

According to an embodiment, the obtaining of the feedback information of the user may include activating at least one of a camera and a microphone, extracting a facial feature vector from an image obtained by the camera or a voice feature vector from a voice signal of the user collected by the microphone, and obtaining emotion information of the user by comparing the facial feature vector or the voice feature vector with data in a previously stored emotion table.

The terminology "module" used herein may mean, for example, a unit including one of hardware, software, and firmware or two or more combinations thereof. The terminology "module" may be interchangeably used with, for example, terminologies "unit," "logic," "logical block," "component," or "circuit," and the like. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The processor 120 described above may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A home robot device comprising:
   a memory;
   a movement module; and
   a processor electrically connected with the memory and the movement module, wherein the processor is configured to:
using the movement module, execute a motion based on specified motion execution information stored in the memory;
obtain feedback information of a user;
generate a reward value from the feedback information, wherein the reward value corresponds to a point in the motion;
generate modified motion execution information by modifying at least a portion of the specified motion execution information based on the feedback information of the user, wherein the modified motion execution information includes a movement value of at least one joint unit of the home robot device corresponding to the point in the motion or at least one support linked to the at least one joint unit, wherein the movement value is selected from a probability model of the specified motion execution information, and wherein the movement value is proportional to the reward value; and
execute a motion of the home robot device based on the modified motion execution information.

2. The home robot device of claim 1, wherein the processor is further configured to:
obtain external motion information from a motion information providing source;
extract reference information included in the external motion information, wherein the reference information includes information on a number of at least one joint of the motion information providing source, a position of the at least one joint, a movement direction of the at least one joint, or a movement angle of the at least one joint; and
generate the specified motion execution information based on contraction-mapping the extracted reference information to the at least one joint unit of the home robot device.

3. The home robot device of claim 2, wherein the processor is further configured to:
classify the at least one joint in the extracted reference information according to one or more parts of the motion information providing source; and
map the at least one joint in the extracted reference information to corresponding joint units in the home robot device by corresponding the one or more parts of the motion information providing source to one or more parts of the home robot device associated with the joint units.

4. The home robot device of claim 1, wherein the processor is further configured to:
obtain external motion information from a motion information providing source;
extract reference information included in the external motion information, wherein the reference information includes information on a number of at least one joint of the motion information providing source, a position of the at least one joint, a movement direction of the at least one joint, or a movement angle of the at least one joint; and
identically map the movement direction, the movement angle, or a movement speed of the at least one joint in the reference information to the at least one joint unit of the home robot device.

5. The home robot device of claim 2, further comprising at least one of:

a camera configured to obtain an image of the motion information providing source to acquire the external motion information, and
a communication circuit configured to receive the external motion information from an external electronic device.

6. The home robot device of claim 1, further comprising:
a camera,
wherein the processor is further configured to:
extract coordinates of a face feature point of the user by analyzing an image obtained using the camera; and
determine emotion information by comparing the coordinates of the face feature point with coordinate data in an emotion table previously stored in the memory.

7. The home robot device of claim 6, wherein the processor is further configured to:
compare the emotion information of the user with a preference table stored in the memory to determine a user preference score value; or
determine the user preference score value based on preference distribution information previously stored in the memory.

8. The home robot device of claim 7, wherein the processor is further configured to modify at least a portion of the specified motion execution information to increase the user preference score value.

9. The home robot device of claim 8, wherein the processor is further configured to:
modify the specified motion execution information by a specified number of times or more;
modify the specified motion execution information until the user preference score value is a specified value or more; or
modify the specified motion execution information until an inflection point, at which the user preference score value changes from positive to negative.

10. The home robot device of claim 1, further comprising:
at least one of a camera and a microphone,
wherein the processor is further configured to:
extract a facial feature vector from an image obtained by the camera or a voice feature vector from a voice signal of the user collected by the microphone; and
obtain emotion information of the user by comparing the facial feature vector or the voice feature vector with data in an emotion table previously stored in the memory.

11. An operation method for a home robot device, the operation method comprising:
executing a motion of the home robot device based on specified motion execution information stored in a memory;
obtaining feedback information of a user;
generating a reward value from the feedback information, wherein the reward value corresponds to a point in the motion;
generating modified motion execution information by modifying at least a portion of the specified motion execution information based on the feedback information of the user, wherein the modified motion execution information includes a movement value of at least one joint unit of the home robot device corresponding to the point in the motion or at least one support linked to the at least one joint unit, wherein the movement value is selected from a probability model of the specified motion execution information, and wherein the movement value is proportional to the reward value; and
executing a motion of the home robot device based on the modified motion execution information.

12. The operation method of claim 11, further comprising:
generating the specified motion execution information,
wherein the generating of the specified motion execution information includes:
   obtaining external motion information from a motion information providing source;
   extracting reference information included in the external motion information, wherein the reference information includes information on a number of at least one joint of the motion information providing source, a position of the at least one joint, a movement direction of the at least one joint, or a movement angle of the at least one joint; and
   generating the specified motion execution information based on contraction-mapping the extracted reference information to the at least one joint unit of the home robot device.

13. The operation method of claim 12, wherein the obtaining of the external motion information includes at least one of:
   obtaining an image of the motion information providing source using a camera; and
   obtaining the external motion information from an external electronic device using a communication channel established between the home robot device and the external electronic device.

14. The operation method of claim 12, wherein the generating of the specified motion execution information further includes:
   classifying the at least one joint in the extracted reference information according to one or more parts of the motion information providing source; and
   mapping the at least one joint in the extracted reference information to corresponding joint units in the home robot device by corresponding the one or more parts of the motion information providing source to one or more parts of the home robot device associated with the joint units.

15. The operation method of claim 11, further comprising:
generating the specified motion execution information,
wherein the generating of the specified motion execution information includes:
   obtaining external motion information from a motion information providing source;
   extracting reference information included in the external motion information, wherein the reference information includes information on a number of at least one joint of the motion information providing source, a position of the at least one joint, a movement direction of the at least one joint, or a movement angle of the at least one joint; and
   identically map the movement direction, the movement angle, or a movement speed of the at least one joint in the reference information to the at least one joint unit of the home robot device.

16. The operation method of claim 11, wherein the obtaining of the feedback information of the user includes:
   activating a camera;
   extracting coordinates of a face feature point of the user by analyzing an image obtained using the camera; and
   determining emotion information of the user by comparing the coordinates of the face feature point with coordinate data in a previously stored emotion table.

17. The operation method of claim 16, wherein the obtaining of the feedback information of the user further includes:
   comparing the emotion information of the user with a previously stored preference table to determine a user preference score value; or
   determine the user preference score value based on previously stored preference distribution information.

18. The operation method of claim 17, wherein the generating of the modified motion execution information further includes:
   modifying at least a portion of the specified motion execution information to increase the user preference score value.

19. The operation method of claim 18, wherein the generating of the modified motion execution information further includes one of:
   modifying the specified motion execution information by a specified number of times or more;
   modifying the specified motion execution information until the user preference score value is a specified value or more; or
   modifying the specified motion execution information until an inflection point, at which the user preference score value changes from positive to negative.

20. The operation method of claim 11, wherein the obtaining of the feedback information of the user includes:
   activating at least one of a camera and a microphone;
   extracting a facial feature vector from an image obtained by the camera or a voice feature vector from a voice signal of the user collected by the microphone; and
   obtaining emotion information of the user by comparing the facial feature vector or the voice feature vector with data in a previously stored emotion table.

* * * * *